(12) United States Patent
Murai et al.

(10) Patent No.: US 7,215,822 B2
(45) Date of Patent: *May 8, 2007

(54) IMAGE PROCESSING DEVICE AND IMAGE OUTPUTTING DEVICE

(75) Inventors: Kiyoaki Murai, Matsumoto (JP); Masanori Ishida, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 861 days.

This patent is subject to a terminal disclaimer.

(21) Appl. No.: 10/385,747

(22) Filed: Mar. 12, 2003

(65) Prior Publication Data

US 2003/0179946 A1 Sep. 25, 2003

(30) Foreign Application Priority Data

Mar. 22, 2002 (JP) ............................. 2002-081065

(51) Int. Cl.
*G06K 9/40* (2006.01)

(52) U.S. Cl. ................. 382/264; 382/274; 382/275; 358/3.26; 358/3.27; 358/463; 345/611

(58) Field of Classification Search .............. 382/260, 382/274, 275, 263, 264; 358/3.26, 3.27, 358/463; 345/611, 616, 618

See application file for complete search history.

(56) References Cited

U.S. PATENT DOCUMENTS

| 5,146,319 | A | | 9/1992 | Engel et al. |
| 5,255,329 | A | * | 10/1993 | Tanimizu et al. ............ 382/112 |
| 5,267,031 | A | * | 11/1993 | Katoh et al. .................. 358/527 |
| 5,493,322 | A | * | 2/1996 | Ng et al. ....................... 347/240 |
| 5,612,903 | A | * | 3/1997 | Miller .......................... 355/35 |
| 5,832,142 | A | | 11/1998 | Ito |
| 5,987,222 | A | * | 11/1999 | Terashita .................... 358/1.9 |
| 6,028,958 | A | * | 2/2000 | Kanamori .................... 382/171 |
| 6,061,144 | A | * | 5/2000 | Mamizuka .................... 358/1.9 |
| 6,079,885 | A | | 6/2000 | Sano |
| 6,172,718 | B1 | | 1/2001 | Alvarez et al. |
| 6,568,323 | B2 | * | 5/2003 | Tokiwa ........................ 101/227 |
| 6,618,079 | B1 | * | 9/2003 | Higuchi .................... 348/223.1 |

(Continued)

FOREIGN PATENT DOCUMENTS

DE 39 19 817 12/1990

(Continued)

*Primary Examiner*—Yosef Kassa
(74) *Attorney, Agent, or Firm*—Oliff & Berridge, PLC (57) ABSTRACT

The invention naturally enhances the sharpness of an image by performing appropriate sharpness processing. An image processing device receives input original image data, performs sharpness processing, and outputs correction image data. Specifically, the degree of the level change is detected from the original image data, and correction-reference-amount data, which provides a reference to determine the degree of sharpness correction, is determined based on the degree of the detected level change. Meanwhile, the relationship between correction amount by which the sharpness correction is performed and the correction reference amount is defined by a predetermined correction-amount characteristic pattern. The correction-amount calculating device calculates an adequate correction amount in accordance with the correction-amount characteristic pattern, and the sharpness processing means performs sharpness processing on the original image data in accordance with the correction amount. In this case, the correction determining pattern has a characteristic that the correction amount varies in accordance with the magnitude of the correction reference amount. Thus, in accordance with a level change in the original image data, the sharpness correction is performed by an adequate correction amount, which can sharpen the original image data to an adequate degree.

10 Claims, 9 Drawing Sheets

U.S. PATENT DOCUMENTS

| | | | |
|---|---|---|---|
| 6,633,330 B1 * | 10/2003 | Sugiura et al. | 348/188 |
| 6,646,655 B1 * | 11/2003 | Brandt et al. | 715/723 |
| 6,674,488 B1 * | 1/2004 | Satoh | 348/663 |
| 6,952,287 B2 * | 10/2005 | Aoki | 358/1.9 |

FOREIGN PATENT DOCUMENTS

| | | |
|---|---|---|
| EP | 0 365 037 | 4/1990 |
| GB | 2 165 717 | 4/1986 |
| JP | A 2-275589 | 11/1990 |
| JP | A 06-062230 | 3/1994 |
| JP | A-06-096201 | 4/1994 |
| JP | A 10-028225 | 1/1998 |

\* cited by examiner

ORIGINAL IMAGE DATA So

CORRECTION-REFERENCE-AMOUNT SIGNAL Sr (LAPLACIAN SIGNAL)

CORRECTION-AMOUNT SIGNAL Sa

CORRECTION IMAGE DATA Sc

FIG. 3A

EXAMPLE 1 OF COEFFICIENT FOR LAPLACIAN CALCULATION

| 0 | −1 | 0 |
|---|----|---|
| −1 | 4 | −1 |
| 0 | −1 | 0 |

FIG. 3B

EXAMPLE 2 OF COEFFICIENT FOR LAPLACIAN CALCULATION

| −1 | −1 | −1 |
|----|----|----|
| −1 | 8 | −1 |
| −1 | −1 | −1 |

IMAGE PROCESSING DEVICE AND IMAGE OUTPUTTING DEVICE

BACKGROUND OF THE INVENTION

1. Field of Invention

The present invention relates to an image processing device and to a sharpness processing method that is preferable in displaying an image on a display region of a relatively small device, such as, particularly, a portable telephone or portable terminal device, for example.

2. Description of Related Art

In image display devices, an image to be displayed is subjected to what is referred to as "sharpness processing", which sharpens the outline of an image to make the image easy to view. The sharpness processing can sharply display an original image that is somewhat fuzzy.

In devices, such as portable telephones and portable terminal devices having relatively small display regions, for example, in the related art, somewhat strong sharpness processing can be provided to make the outline or the like of a displayed image to be clear and easy to view.

SUMMARY OF THE INVENTION

Too strong sharpness processing, however, may adversely cause a display image to become unnatural. For example, when an image of a human face is displayed, too strong a degree of sharpness processing may cause facial image data to become too white (such a phenomenon is also referred to as "white spotting") in the vicinity of the border between the face and the black hair. On the other hand, too much reduced degree of sharpness processing may provide a fuzzy image due to lack in sharpness in some images.

In view of the foregoing, the present invention naturally enhances the sharpness of an image by adequately performing sharpness processing.

An image processing device of the present invention includes a correction-reference-amount determining device to detect a degree of a level change in original image data and to generate correction-reference-amount data indicating an reference amount for correction by sharpness processing in accordance with the degree of the detected level change; and a correction-amount calculating device to calculate a correction amount in accordance with a pre-determined correction-amount determining pattern, based on the correction-reference-amount data. The image processing device further includes a sharpness processing device to perform sharpness processing on the original image data in accordance with the correction amount to generate correction image data. The correction-amount determining pattern has a characteristic that the correction amount varies in accordance with the magnitude of the correction reference amount.

The image processing device receives the input original image data, performs sharpness processing on the original image data, and outputs the correction image data. From the original image data, the degree of the level change therein is detected. When the original data is color image data, a change in brightness level is detected, and when the original image data is the image data of individual colors of RGB, a level change in the image data of each color is detected. Then, based on the degree of the detected level change, the correction-reference-amount data, which provides a reference to determine the degree of sharpness correction, is generated.

Meanwhile, the relationship between the correction amount by which the sharpness correction is to be performed and the correction reference amount is defined by a pre-determined correction-amount characteristic pattern. The correction-amount calculating device calculates an adequate correction amount in accordance with the correction-amount characteristic pattern, and the sharpness processing device performs sharpness processing on the original image data in accordance with the correction amount. The correction-amount determining pattern has a characteristic that the correction amount varies in accordance with the magnitude of the correction reference amount. Thus, in accordance with the level change in the original image data, the sharpness processing is performed by a required correction amount, which can adequately sharpen the original image data.

In one aspect of the image processing device, the correction determining pattern can have a characteristic that the rate of change in the correction amount when the correction reference amount is a positive value and the rate of change in the correction amount when the correction reference amount is a negative value are different from each other. In another aspect of the image processing device, the correction-amount determining pattern may have a characteristic that the rate of change in the correction amount when the correction reference amount varies so that a white component in the original image data increases is smaller than the rate of change in the correction amount when the correction reference amount varies so that a black component in the original image data increases. According to these aspects, even when the original data has an asymmetric characteristic in the white or black level direction, the sharpness correction can be performed to an adequate degree.

In still another aspect of the image processing device, the correction-amount determining pattern may have a characteristic that the rate of change in the correction amount when the absolute value of the correction reference amount is a first predetermined value or greater is smaller than the rate of change in the correction amount when the absolute value of the correction reference amount is less than the first predetermined value. According to this aspect, it is possible to prevent an outline portion or a portion where a level change is rapid in the original image data from being unnaturally emphasized, or to reduce such emphasis, as a result of further sharpness processing on a portion where the original data is at a certain level or more.

In still another aspect of the image processing device, the correction-amount determining pattern can be such that, when the correction reference amount is in the range from a second predetermined value at which the polarity of the correction reference amount is negative to a third predetermined value at which the polarity of the correction reference amount is positive, the correction amount is zero. In still another aspect of the image processing device, the image processing device may further include a device to perform smoothing processing on the original image data when the correction reference amount is in the range from the second predetermined value at which the polarity of the correction reference amount is negative to the third predetermined value at which the polarity of the correction reference amount is positive. At a portion where the level change in image data is relatively small, the level change often results from noise introduced to the image data other than from a change in the image itself. When sharpness processing is performed on even such a noise portion, an image whose noise is emphasized is provided. Accordingly, a portion associated with a small level change to a certain degree is regarded as noise and sharpness processing is not performed thereon, which can prevent a noise component from being emphasized, or reduce such emphasis. In addition, smoothing processing is performed by regarding such a portion where the level change is small, which can further reduce the influence of noise on a displayed image.

In the image processing device, when the original image data is So, the correction-reference-amount data is Sr, and the correction image data is Sc, the correction amount is a function, which is expressed by F(Sr), of the correction-reference-amount data and the correction image data Sc can be expressed by Sc=So+F(Sr). Thus, in accordance with the level change in the original image data, the sharpness processing is performed by an adequate correction amount, which can sharpen the original image data to an adequate degree.

In the image processing device, the correction-amount determining pattern has a characteristic that the relationship between the correction amount F(P) for a given first correction reference amount (P) and the correction amount F(−P) for a second correction reference amount (−P) having the absolute value equal to that of the first correction reference amount P and having a polarity different therefrom is given by:

$$|F(P)|<|F(-P)|$$

when the correction reference amount P is sufficiently large. Thus, even when the original data has an asymmetric characteristic in the white or black level direction, the sharpness correction can be performed to an adequate degree.

In one aspect of the image processing device, the correction-reference-amount data may be a Laplacian of the original image data. In another aspect, the correction-reference-amount data may be a difference signal data obtained by subtracting unsharp data from the original image data, the unsharp data being obtained by filtering the original image data with a predetermined unsharp filter.

An image outputting device of the present invention includes the above-described image processing device, and an image-size determining device to determine an image size when the image data is output. The image outputting device further includes a control device to cause the image processing device to execute sharpness processing on the original image data when the image size determined by the image-size determining device is smaller than a predetermined image size, and an output device to output the original image data or correction image data obtained by the sharpness processing.

According to the above image outputting device, an image size to perform outputting image data is determined, and when an output image size is large, the sharpness processing according to the present invention is not performed. On the other hand, when an output image size is small, the sharpness processing according to the present invention is performed to thereby perform adequate sharpness correction, so that a clear image, which is sharpened, can be provided even for a small output image.

DETAILED DESCRIPTION OF PREFERRED EMBODIMENTS

Exemplary embodiments of the present invention are described below with reference to the accompanying drawings.

[Device Configuration]

Figure 1:
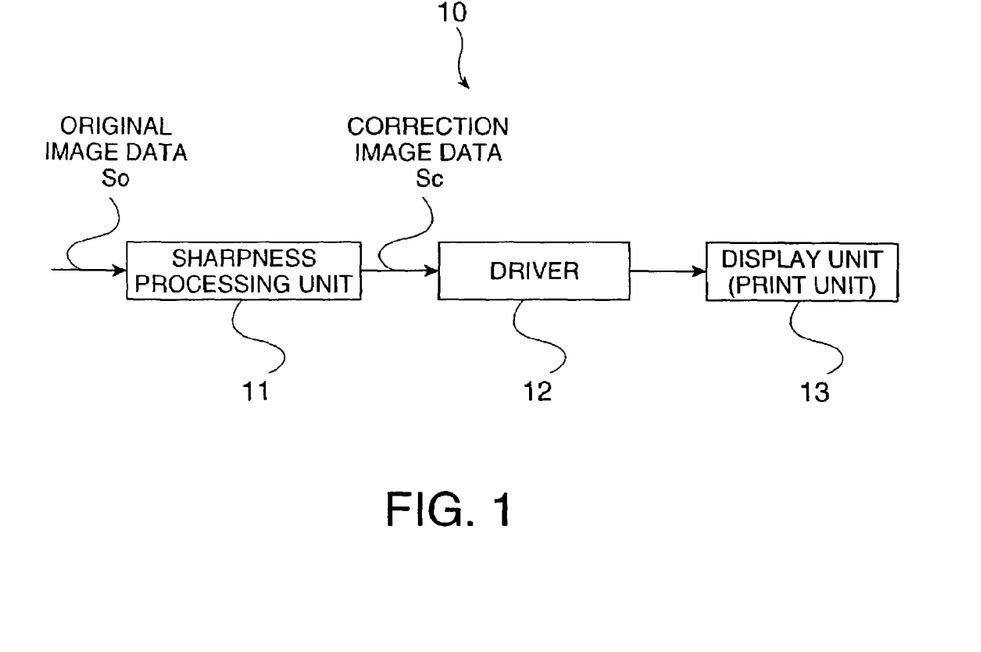
FIG. 1 is a schematic of a significant portion of an image processing device that performs sharpness processing according to the present invention.

FIG. 1 is a schematic of a significant portion of an image processing device according to an exemplary embodiment of the present invention. As shown in FIG. 1, an image processing device 10 of the present invention includes a sharpness processing unit 11, a driver 12, and a display unit (or a print unit) 13. The image processing device 10 of the present invention is applied to a terminal device, such as, preferably a portable telephone or portable terminal device having a relatively small-size display unit. The image processing device 10 of the present invention is also applicable to a color printer or the like, in which case, it will include the print unit 13.

Original image data So is input to the sharpness processing unit 11. When the image processing device 10 is a portable telephone or the like, the original image data So becomes image data received by the portable telephone over a communication channel. When the image processing device 10 is a printer, the original image data So becomes image data supplied from a personal computer or the like to the printer.

The sharpness processing unit 11 performs sharpness processing on the input original image data So to generate correction image data Sc and supplies the correction image data Sc to the driver 12. The driver 12 drives the display unit (or print unit) 13 in accordance with the correction image data Sc. Consequently, an image is displayed or printed.

Figure 2:
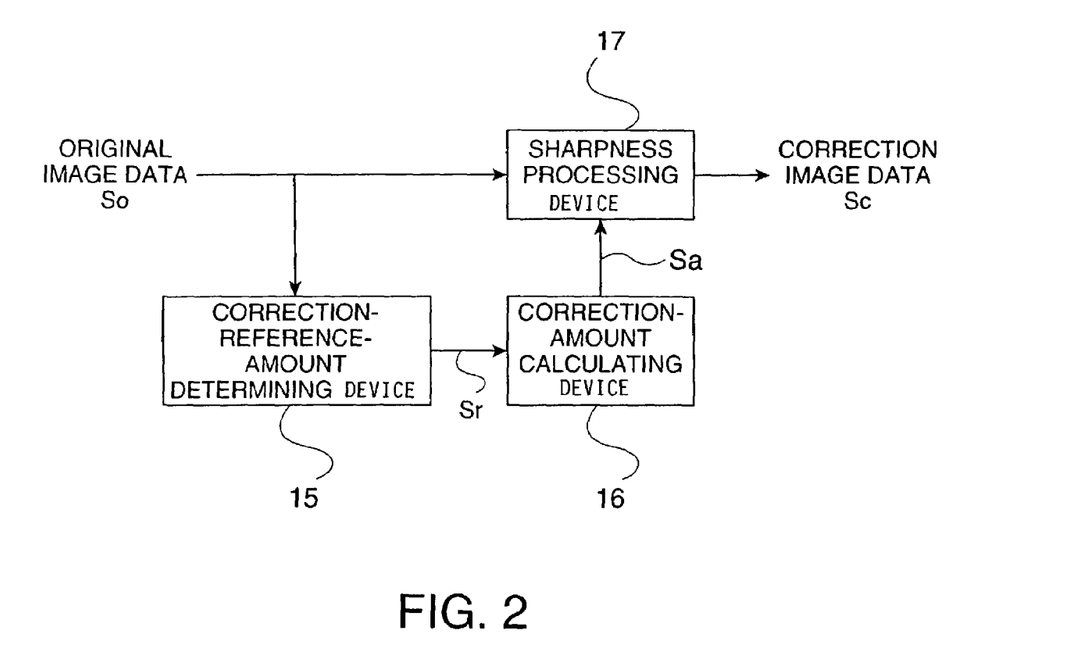
FIG. 2 is a schematic that shows the sharpness processing unit shown in FIG. 1.

FIG. 2 shows the sharpness processing unit 11. As shown in FIG. 2, the sharpness processing unit 11 includes a correction-reference-amount determining device 15, a correction-amount calculating device 16, and a sharpness processing device 17. The original image data So input to the sharpness processing unit 11 is supplied to the correction-reference-amount determining device 15 and the sharpness processing device 17.

The correction-reference-amount determining device 15 uses the original image data So to determine a correction reference amount. The correction reference amount means an amount indicating the degree of sharpness processing to be performed on the original image data So, and specifically represents a concept that includes a Laplacian signal and a difference signal which are described below. The correction-reference-amount determining device 15 generates a correction-reference-amount signal Sr based on the original image data So and supplies the correction-reference-amount signal Sr to the correction-amount calculating device 16.

Based on the correction-reference-amount indicated by the correction-reference-amount signal Sr, the correction-amount calculating device 16 determines a correction amount for the sharpness processing and supplies a correction-amount signal Sa to the sharpness processing device 17. The correction amount corresponds to an amount by which the level of image data is to be changed by sharpness processing. Thus, when the absolute value of the correction amount is large, the level of image data is changed by sharpness processing by a large amount so that the sharpness of the image increases greatly. On the other hand, when the absolute value of the correction amount is small, the level change in image data due to sharpness processing is small and thus the sharpness of the image does not increase such greatly. The positive/negative value of the correction amount indicates toward which color of white or black the image data is varied by the sharpness processing.

In accordance with the correction amount indicated by the correction amount signal Sa supplied from the correction-amount calculating device 16, the sharpness processing device 17 changes the level of the original image data So and generates the correction image data Sc, which is image data that has been subjected to sharpness processing. The sharpness processing device 17 supplies the generated correction image data Sc to the driver 12, which is shown in FIG. 1.

[Correction Reference Amount]

The correction reference amount is described in detail below. The correction reference amount is a reference amount to determine the degree of the sharpness processing to be performed, and the correction-reference-amount signal Sr is a signal indicating the reference amount. Specifically, as the correction-reference-amount signal Sr, either (1) a Laplacian signal of the original image data So or (2) a difference signal generated from the original image data So can be used.

Figure 3A:
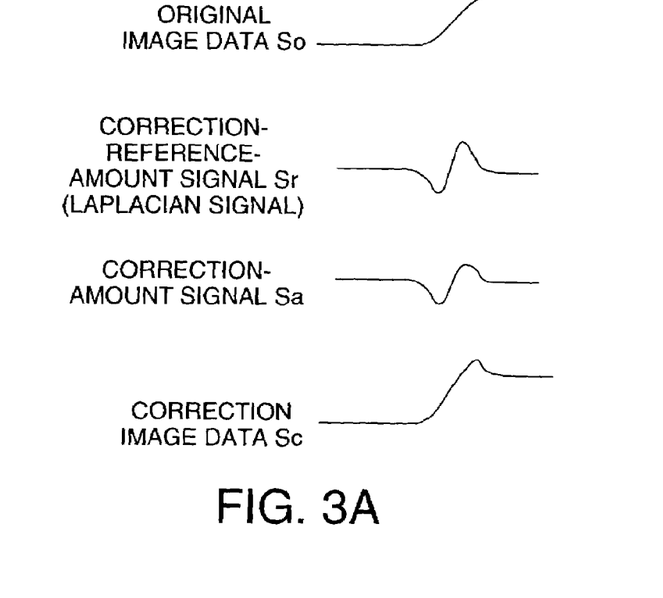
FIGS. 3A–3C are schematics that show examples of individual signals and coefficient examples for a Laplacian filter when a Laplacian signal is used as a correction-reference-amount signal.

First, a description will be made of a case in which a Laplacian signal is used as the correction-reference-amount signal. FIG. 3A shows waveform examples of the original image data So, the correction-reference-amount signal Sr, the correction-amount signal Sa, and the correction image data Sc, when a Laplacian signal is used as the correction-reference-amount signal. In FIG. 3A, the direction of the vertical axis of each waveform indicates the brightness of the original image data, and the upper direction in FIG. 3A indicates white and the lower direction indicates black. The direction of the horizontal axis of each waveform indicates time.

Figure 3B:
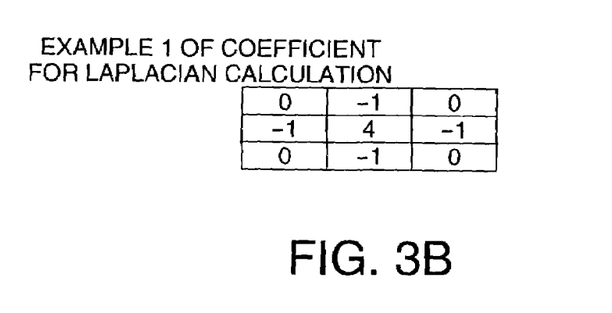
Figure 3C:
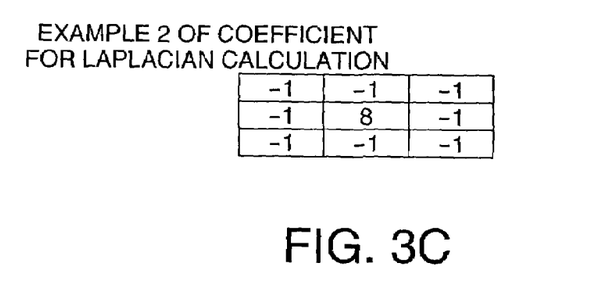

The Laplacian signal can be provided by filtering the original image data So with a Laplacian filter. The Laplacian filter is a kind of differential filter that is used to perform spatial filtering of an image and is mathematically a filter to perform processing that corresponds to a second-order differential operation. FIGS. 3B and 3C indicate examples of coefficients for the Laplacian filter. The Laplacian filter serves to emphasize an outline portion where the density in an image varies rapidly and a high-frequency component. As shown in FIG. 3A, the Laplacian signal has a depression and protrusion in the waveform at a portion where the level of the original image data So starts increasing and a portion where the level thereof becomes constant after the increase ends. At a portion where the waveform of the original image data So protrudes downward, the Laplacian signal becomes a negative value, and at a portion where the waveform of the original image data So protrudes upward, the Laplacian signal becomes a positive value. This Laplacian signal can be used as the correction-reference-amount signal to determine the degree of the sharpness processing to be performed.

Figure 4:
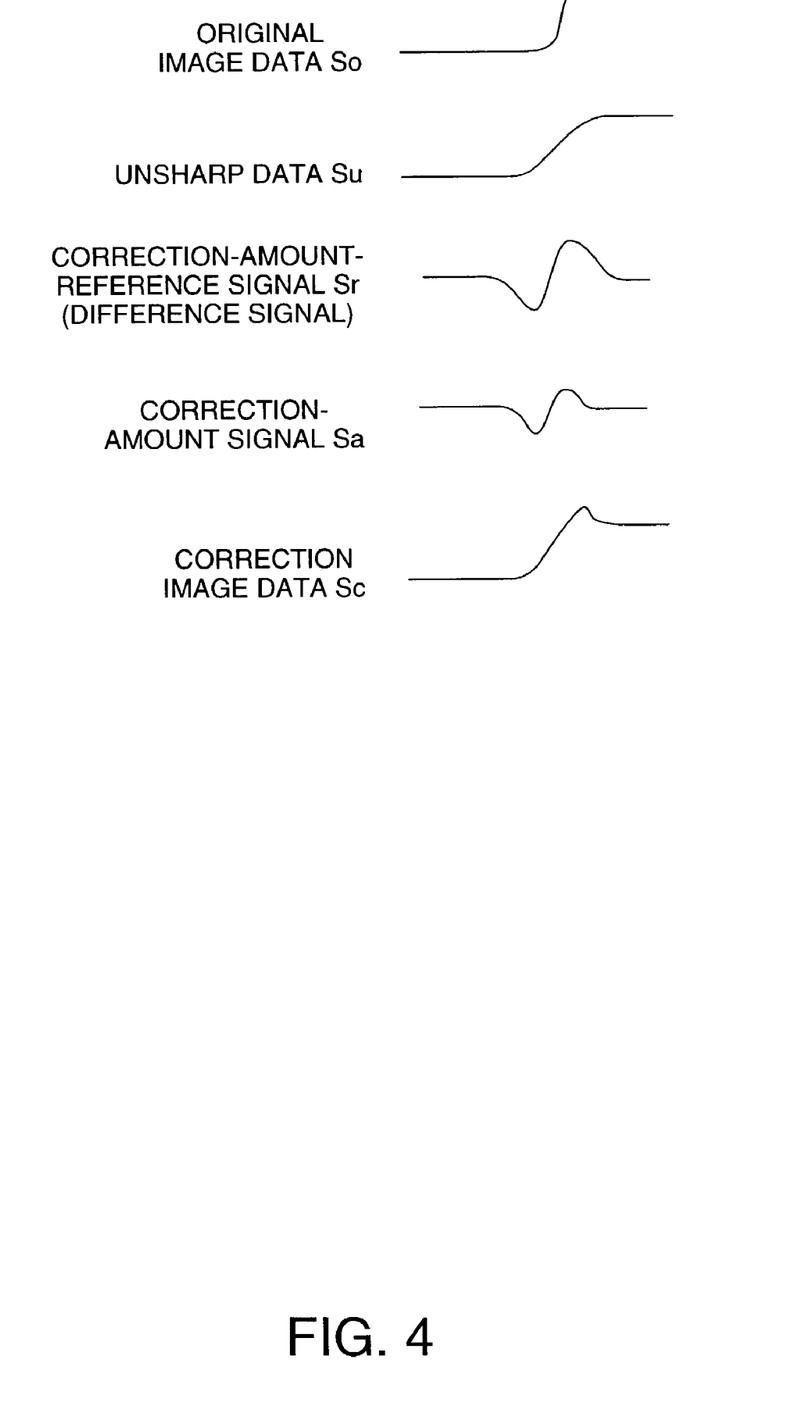
FIG. 4 is a schematic that shows examples of individual signals when a difference signal is used as the correction-reference-amount signal.

A difference signal will now be described. FIG. 4 shows waveform examples of the original image data So, unsharp data Su, the correction-reference-amount signal Sr, the correction-amount signal Sa, and the correction image data Sc when a difference signal is used as the correction-reference-amount signal. In FIG. 4, the direction of the vertical axis of each waveform indicates the brightness of the original image data, and the upper direction in FIG. 4 indicates white and the lower direction indicates black. Further, the direction of the horizontal axis of each waveform indicates time. The difference signal is provided by subtracting the unsharp data Su from the original image data So. Similarly to the Laplacian signal, the difference signal is a signal indicating an outline portion and a high-frequency component in an image. The unsharp data Su is generated by applying an averaging filter to a predetermined region of the original image data So.

Thus, as shown in FIG. 4, the unsharp data Su is provided by locally averaging the original image data So, and the difference signal Sr is provided by subtracting the unsharp data Su from the original image data So. Therefore, Sr=So−Su is given.

Either of the Laplacian and difference signals is a signal that indicates an outline portion or high-frequency portion in an image, and can be used as the correction-reference-amount signal in the present invention. However, the Laplacian signal and the difference signal do not necessarily match with each other in some methods to generate the unsharp signal.

[Method for Determining Correction Amount]

A description is provided below of a method for determining the correction amount in accordance with the correction reference amount. The correction amount is an amount indicating a level change that is made to original image data by the sharpness processing. In general, a correction image data provided by sharpness processing is generated by adding a correction amount corresponding to a constant multiple of the correction reference amount to the original image data. Thus, the following expression is given:

correction image data *Sc*=original image data *So*+correction amount =original image data *So*+α·correction reference amount *Sr* (α is a constant).

Therefore, the correction amount is a multiple of constant α of the correction reference amount.

In contrast, the sharpness processing according to the present invention changes the correction amount in accordance with the correction reference amount, rather than by simply setting the correction amount to be a constant multiple of the correction reference amount Sr. In other words, the correction amount is defined as a function of the correction reference amount, as the correction amount=F (Sr), and the correction amount is changed in accordance with the correction reference amount Sr. Thus, the following expression is given:

correction image data $Sc$=original image data
$So$+correction amount =original image data
$So$+$F$ ($Sr$)

This allows an adequate amount of sharpness correction to be applied to a portion where it is necessary, while preventing the image itself from becoming unnatural due to too strong sharpness correction in a portion in the image, or reducing the unnaturalness of the image.

A specific method of determining the correction amount based on the correction reference amount Sr is described below with reference to correction-amount determining patterns illustrated in FIGS. 5A to 9C. In the individual correction-amount determining patterns in FIGS. 5A to 9C, the horizontal axis indicates the correction reference amount Sr and the vertical axis indicates the correction amount due to the sharpness processing. Thus, FIGS. 5A to 9C are graphs each indicating how the correction amount due to the sharpness processing varies relative to a change in the correction reference amount.

To practically determine the correction amount in accordance with the correction reference amount, a method is provided in which the correction-amount determining pattern as illustrated in FIGS. 5A to 9C is pre-stored in a lookup table or the like and the correction amount is determined by referring to the table. Alternatively, a method is also provided in which a function that defines the correction-amount determining pattern is prepared in advance and a correction amount is determined from the correction reference amount by using the function. In practice, which one is adopted is determined depending on a processing speed, processing accuracy, and the like required by a device to which the present invention is applied.

Figure 5A:
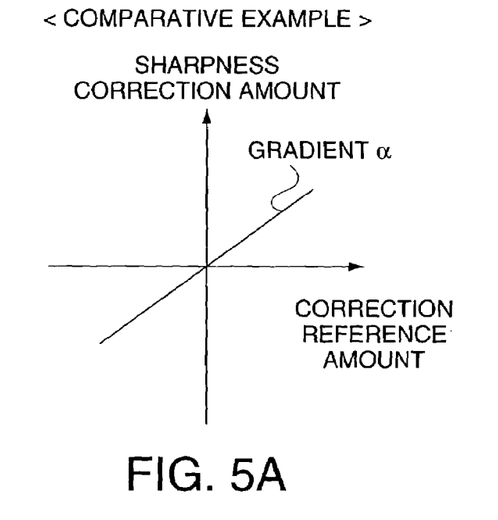
FIGS. 5A–5D are graphs that show examples of correction-amount determining patterns used for sharpness processing of the present invention.

FIG. 5A is a comparative example illustrated for ease of understanding of the correction-amount determining method according to the present invention. Specifically, FIG. 5A illustrates a method of performing sharpness processing by adding a constant multiple of the correction reference amount to the original image data, as described above, when a sharpness correction amount is proportional to the correction reference amount. Thus, the gradient of the graph in FIG. 5A corresponds to constant α.

Figure 5B:
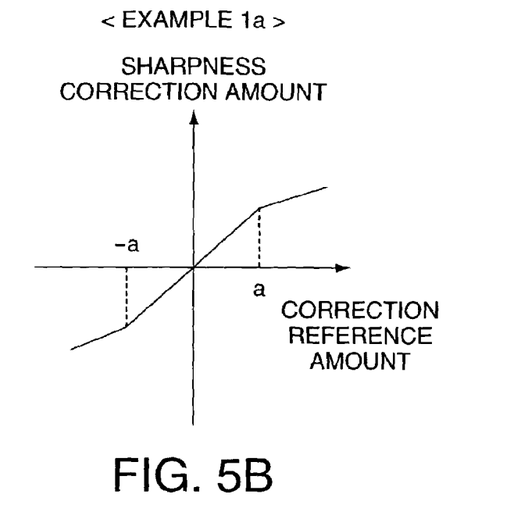

FIG. 5B shows an example 1$a$ of the correction determining patterns according to the present invention. In the example 1$a$, the correction amount is essentially proportional to the correction reference amount. However, when the correction reference amount is larger than a predetermined value a or is smaller than a predetermined value −a, the increase rate of the correction amount is set to be small compared to a case in which the correction reference amount is in the range of −a to +a. A large absolute value of the correction reference amount indicates that the corresponding portion rapidly changes in image level toward white or black. Thus, in such a region where an image level changes rapidly, the increase rate of the correction-amount associated with an increase in the correction reference amount is restrained to some extent. Thus, in a region where a change in brightness is large, the correction amount due to the sharpness processing is reduced, so that the image is prevented from becoming unnatural due to excessive emphasis by the sharpness processing, or the unnaturalness of the image is reduced.

With this arrangement, it is possible to prevent an outline portion of a facial image from being displayed, as described above, with white spots thereon caused by excessive emphasis in sharpness processing, or to reduce such an outline portion.

Figure 5C:
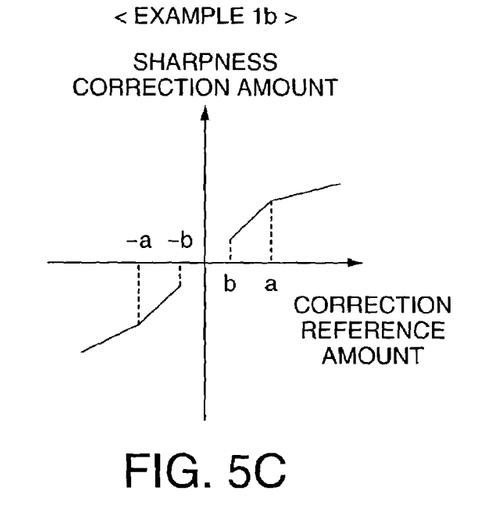
Figure 5D:
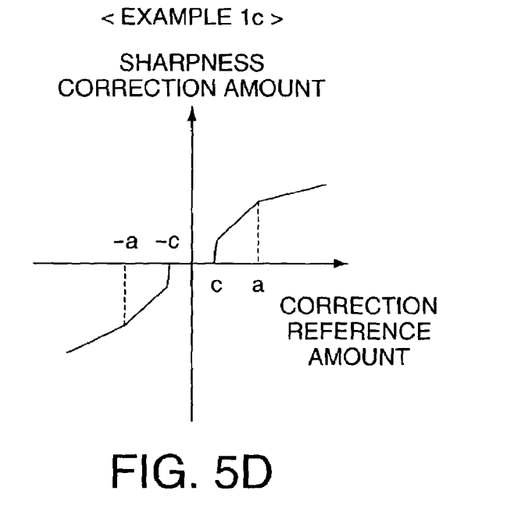

An example 1$b$ shown in FIG. 5C is a modification of the example 1$a$. In the example 1$b$, the correction amount is set to zero, i.e., the sharpness correction is not performed, when the absolute value of the correction reference amount is less than a predetermined value b. The correction reference amount indicates a rapid change in the level of the image data, which means a large change in the level of the image data in a region where the correction reference amount is large. Meanwhile, in a region where the correction reference amount is small, the level of image data does not change so greatly. A relatively small change in the correction reference amount is more often associated with noise that is added to image data rather than being associated with a level change due to the contents of the image itself. From such a viewpoint, when the absolute value of the correction reference amount is less than the predetermined value b, such a degree of change in the correction reference amount is regarded as being caused by noise and thus sharpness processing is not be performed. When a region where noise in an image is large is subjected to sharpness processing, there is a tendency that the noise is emphasized and increased to thereby make it difficult to view the image in some cases. Thus, considering a change in the correction reference amount less than the predetermined value b, as in the example 1$b$, as noise and excluding the change from sharpness processing is effective to display an image with a relatively large amount of noise in a easy-to-view manner.

An example 1$c$ shown in FIG. 5C is essentially based on the same way of thinking as the example 1$b$, and thus the sharpness processing is not performed in a region where the absolute value of a correction reference amount is less than a predetermined value c. In the example 1$c$, however, the correction amount is increased gradually from zero, from a region where the sharpness processing is not performed on the correction reference amount toward a region where the sharpness process is performed thereon (i.e., as the correction reference amount increases from a value less than the predetermined value c and exceeds the predetermined value c). This can prevent the image from becoming unnatural due to a rapid change between the application and the non-application of the sharpness processing in a region where the absolute value of the correction reference amount is close to the predetermined value c, or to reduce the unnaturalness of the image.

Figure 6A:
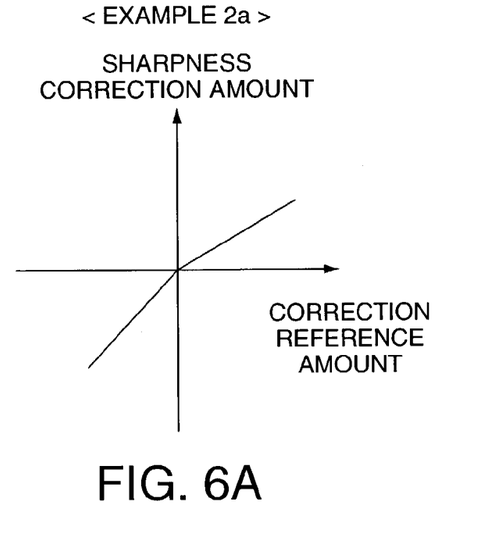
FIGS. 6A and 6B are graphs that show alternative examples of the correction-amount determining patterns used for the sharpness processing of the present invention.
Figure 6B:
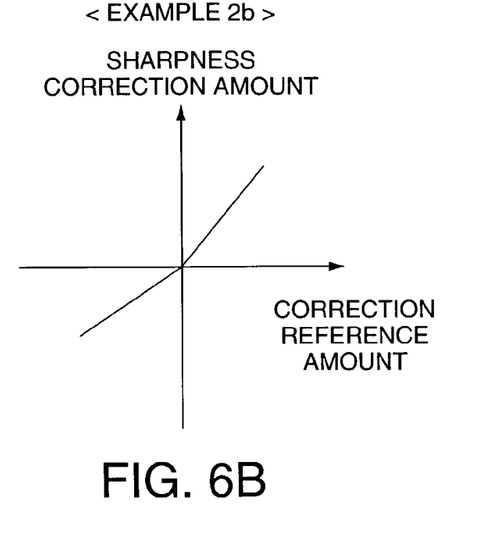

Either of examples 2$a$ and 2$b$ illustrated in FIG. 6 has a relationship that the correction amount is proportional to the correction reference amount, but is provided such that the increase rates of the correction amount are different between a portion where the correction reference amount is positive and a portion where the correction amount is negative.

The correction reference amount is determined from the relative level difference between a pixel of interest and pixels surrounding the pixel and is an amount irrelevant to the level of the pixel itself of interest. A positive correction reference amount indicates that the image data protrudes upward, i.e., the pixel is shifted toward white compared to the surrounding pixels. Also, a negative correction reference amount indicates that the image data protrudes downward, i.e., the pixel is shifted toward black compared to the surround pixels. In sharpness processing, in general, when the correction reference amount is positive, the sharpness correction amount is corrected to be positive, i.e., toward white, and when the correction reference amount is negative, the sharpness correction amount is corrected to be negative, i.e., toward black. However, when the correction reference amount is small, sharpness correction is not performed in some cases. That is, in some cases, even when the correction reference amount is positive, no correction may be made toward white, and even when the correction reference amount is negative, no correction may be made toward black.

In the example 2a, the increase rate of the correction amount is reduced in a region where the correction reference amount is positive (a region where the image data protrudes upward, i.e., a pixel of interest is shifted toward white compared to the surrounding pixels and is corrected toward white as the correction direction) more than in a region where the correction reference amount is negative (a region where the image data protrudes downward, i.e., a pixel of interest is shifted toward black compared to the surrounding pixels and is corrected toward black as the correction direction). This example is particularly effective to prevent the above-described phenomenon that a human face has white spots in part, or to reduce this phenomenon. Since the brightness level of a human skin color lies toward white, it is possible to effectively reduce or prevent the problem that skin color region has white spots by somewhat reducing the degree of the sharpness emphasis at a position on a displayed image having a rapid change in brightness in a region where the brightness of the image data lies toward white.

On the other hand, in the example 2b, the increase rate of the correction amount is reduced more in a region where the correction reference amount is negative than in a region where the correction reference amount is positive. This is opposite to an idea to prevent a skin-color portion from having white spots thereon, but is effective to reduce noise in a particular case. Examples includes a case in which the original image data to be subjected to sharpness processing is likely to contain noise at a brightness level toward black depending on the source and/or the processing method of an image data.

Figure 7A:
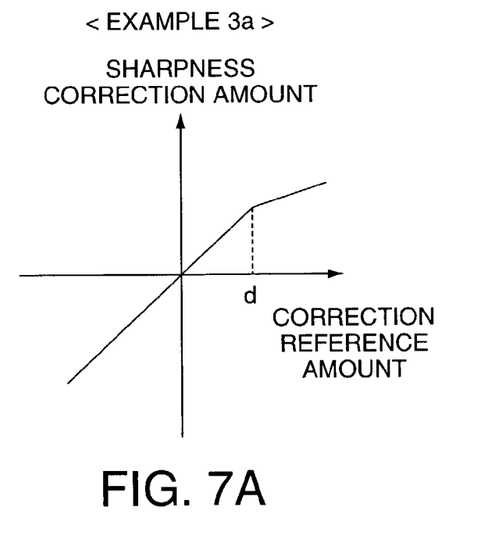
FIGS. 7A and 7B are graphs that show alternative examples of the correction-amount determining patterns used for the sharpness processing of the present invention.
Figure 7B:
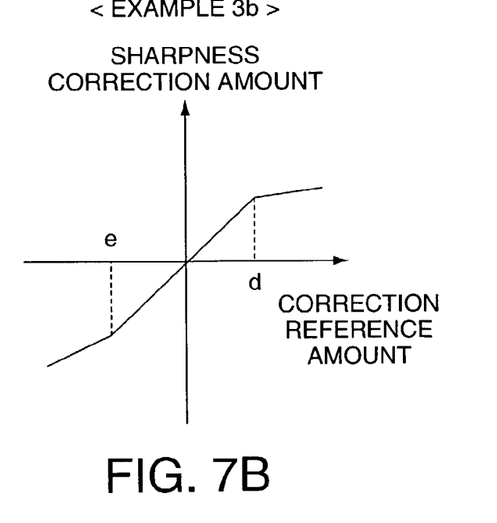
Figure 8A:
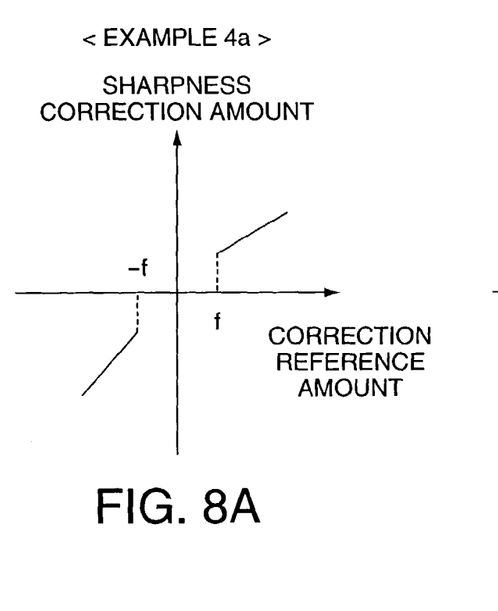
FIGS. 8A–8D are graphs that show alternative examples of the correction-amount determining patterns used for the sharpness processing of the present invention.
Figure 8B:
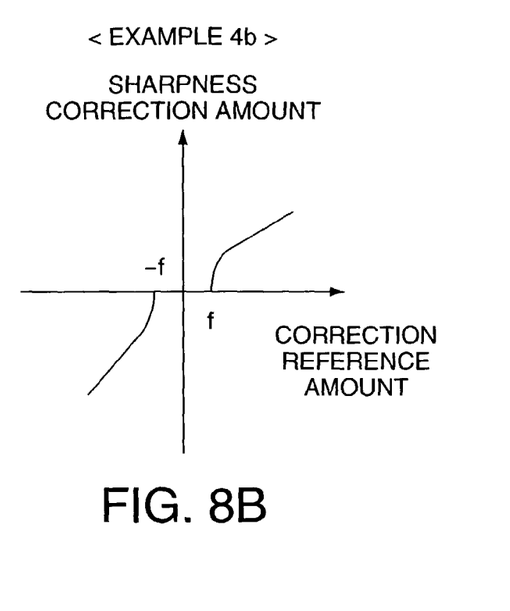
Figure 8C:
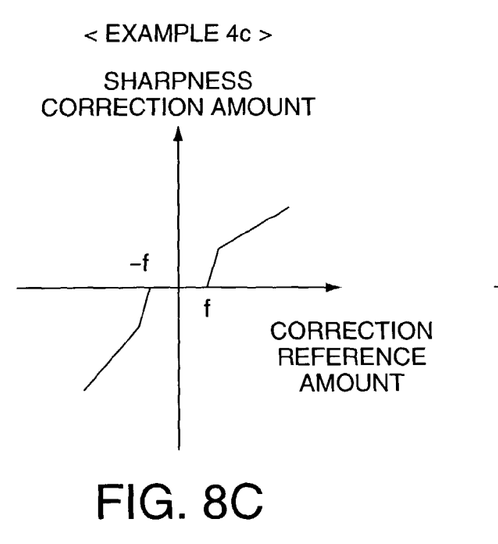
Figure 8D:
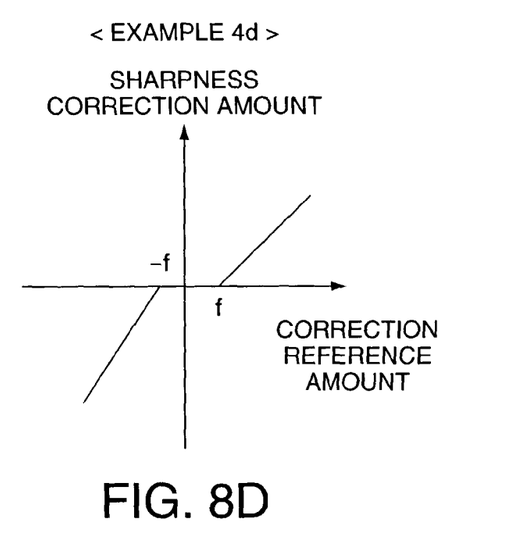

Either of examples 3a and 3b illustrated in FIGS. 7A and 7B shows a method of reducing the increase rate of the correction amount when the correction reference amount exceeds a predetermined value d. These examples are also effective to prevent the above-described problem in that a skin-color portion has white spots, or to reduce this problem. In the example 3a, in the case in which the correction reference amount is equal to or less than the predetermined value d, the correction amount is determined at the same rate of an increase relative to the correction reference amount, even when the correction reference amount is negative. In contrast, in the example 3b, even when the correction reference amount is less than a predetermined value e, the increase rate of the correction amount is reduced relative to the correction reference amount.

In any one of examples 4a to 4d illustrated in FIGS. 8A–8D, the increase rate of the correction amount in a region where the correction reference amount is positive is set to be smaller than that in a region where the correction reference amount is negative. This prevents skin color from having white spots as described above, or reduces the white spots. Further, in any one of the cases, when the absolute value of the correction reference amount is less than a predetermined value f, the correction amount is zero and thus no sharpness processing is performed to prevent noise from being emphasized or to reduce such emphasis. In the example 4a, the correction amount is determined discontinuously in regions where the absolute value of the correction reference amount becomes the predetermined value f. That is, the sharpness processing is not performed until the absolute value of the correction reference amount reaches the predetermined value f, and the sharpness processing is performed by a predetermined correction amount when the absolute value of the correction reference amount becomes the predetermined value f. In contrast, in the examples 4b and 4c, after the absolute value of the correction reference amount becomes the predetermined value f, the correction amount increases gradually from zero such that the image is gradually emphasized due to the sharpness processing. In the example 4b, after the absolute value of the correction reference amount becomes the predetermined value f, the correction amount first increases in a curve and then increases linearly. In contrast, in the examples 4c and 4d, after the absolute value of the correction reference amount becomes the predetermined value f, the correction amount increases linearly from the beginning. The example 4c is an example in which the correction amount increases along two straight lines that have different gradients, and the example 4d is an example in which the correction amount increases along a straight line having one gradient.

Figure 9A:
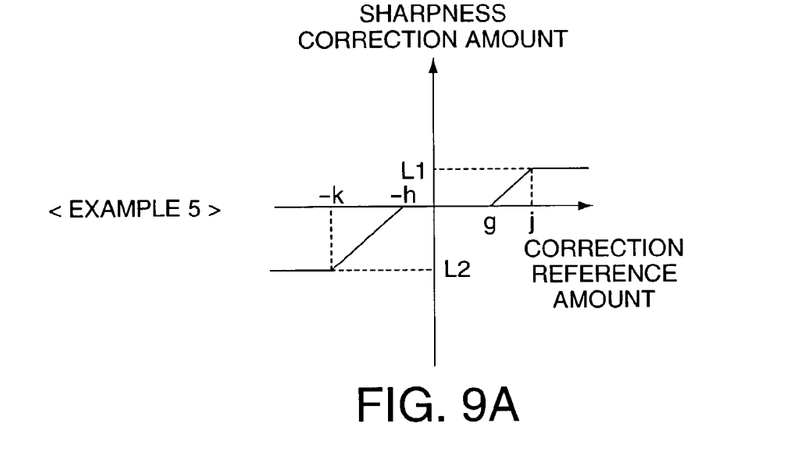
FIGS. 9A–9C are graphs that show alternative examples of the correction-amount determining patterns used for the sharpness processing of the present invention.

In an example 5 illustrated in FIG. 9A, when the absolute value of the correction reference amount is small, sharpness processing is not performed. In addition, when the correction reference amount increases in the positive direction (a situation having a protrusion toward white) and the negative direction (a situation having a protrusion toward black), values at which the sharpness processing is started are made different from each other. That is, when the correction reference amount increases in the positive direction, the sharpness processing is not performed until the correction reference amount reaches a predetermined value g. In contrast, when the correction reference amount increases in the negative direction, the sharpness processing is started at a predetermined value $-h(h<g)$. Further, when the correction reference amount is more than a predetermined value j, the correction amount is set to be a constant value L1, and when the correction reference amount is less than a predetermined value $-k$, the correction amount is set to be a constant value L2. That is, when the correction reference amount exceeds a predetermined value, the correction amount is maintained to be a constant value such that the excessive emphasis due to the sharpness processing is prevented or reduced. Even in such a case, when the correction reference amount increases in the white direction, the correction amount is maintained to be the small value (L1) than when it increases in the black direction, to prevent a skin-color portion from having white spots thereon.

Figure 9B:
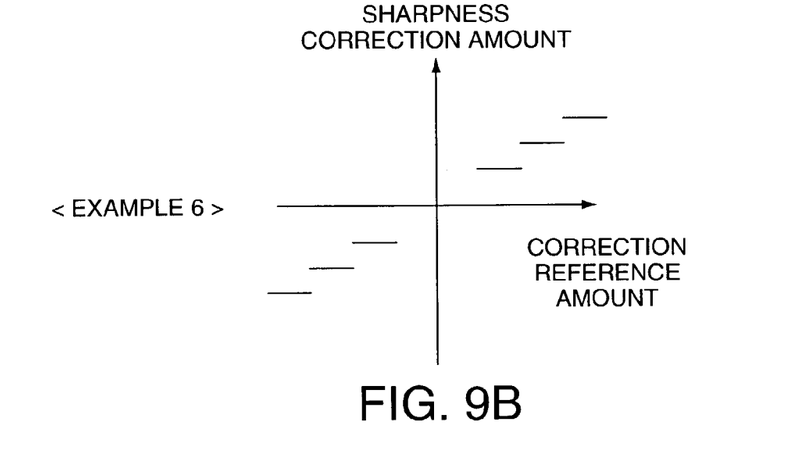

In an example 6 illustrated in FIG. 9B, the correction amount is set in stages relative to the correction reference amount. This method provides some advantages. Specifically, when the determination of the correction amount in accordance with the correction reference amount is made using a lookup table, it is possible to reduce the amount of data to be stored in the lookup table. Also, when the determination of the correction amount in accordance with the correction reference amount is made from calculation using a function, it is possible to reduce processing burden and processing time required for the calculation.

Figure 9C:
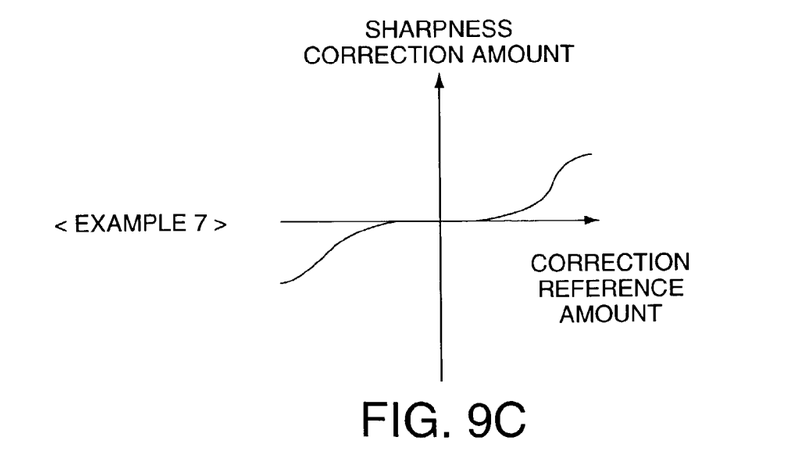

As shown in FIG. 9C, depending on the characteristic of an image data to be subjected to the sharpness processing, a change in the correction amount relative to the correction reference amount can be defined by a pre-designed curve to thereby smoothly control the correction value.

[Sharpness Processing]

Figure 10:
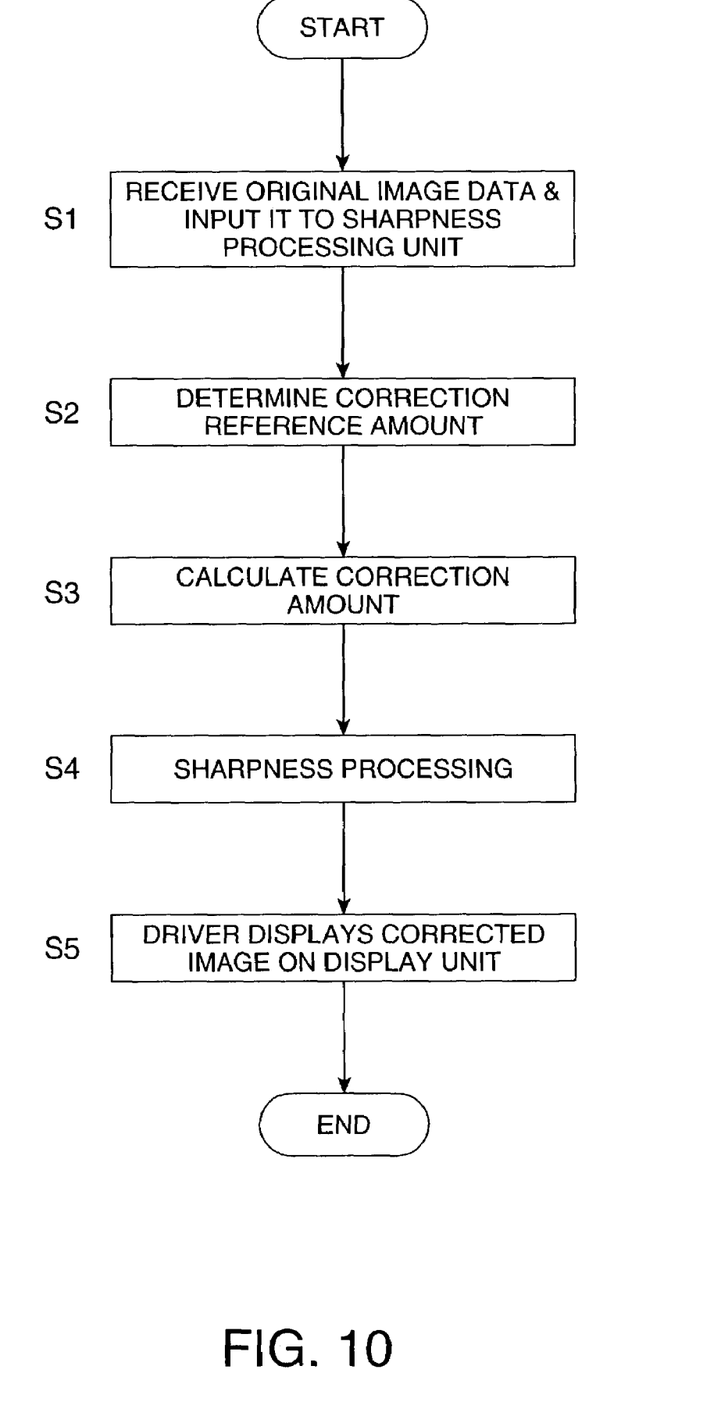
FIG. 10 is a flowchart of the sharpness processing of the present invention.

A description is provided below of a flow of the sharpness processing according to the present invention. FIG. 10 is a flowchart of the sharpness processing according to the present invention. In the below, a description will be given to a case in which the image processing device that executes the sharpness processing of the present invention is applied to a portable telephone.

First, the portable telephone receives the original image data So to be displayed and supplies the data So to the sharpness processing unit 11 shown in FIG. 1 (step S1).

In the sharpness processing unit 11, the supplied original image data So is temporarily expanded in a task memory or the like, which is not shown. The correction-reference-amount determining device 15 determines the correction reference amount by using the original image data So and generates the correction-reference-amount signal Sr (step S2). As described above, the correction-reference-amount signal Sr may be the Laplacian signal shown in FIG. 3A or may be the difference signal shown in FIG. 4. When it is a Laplacian signal, the correction-reference-amount determining device 15 filters the original image data So, which is expanded in the task memory or the like, by using, for example, a Laplacian filter as shown in FIG. 3B or 3C, to thereby generate the Laplacian signal which provides the correction-reference-amount signal Sr. Meanwhile, when the correction-reference-amount signal Sr is a difference signal, the correction-reference-amount determining device 15 generates the unsharp data shown in FIG. 4 by using a predetermined unsharp filter and subtracts the unsharp data from the original image data So to generate the difference signal which provides the correction-reference-amount signal Sr.

Next, by using the correction-reference-amount signal Sr obtained in that manner, the correction-amount calculating device 16, which is shown in FIG. 2, calculates the correction amount to generate the correction amount signal Sa (step S3). The correction amount is calculated using one of the correction-amount determining patterns illustrated in FIGS. 5A to 9C. The correction-amount determining pattern is prepared, as described above, in the form of a lookup table in advance or is defined as a function. For each correction reference amount contained in the correction-reference-amount signal Sr, the correction-amount calculating means 16 refers to the lookup table or performs calculation in accordance with the function, to thereby determine the correction amount and generate the correction amount signal Sa. The correction-amount calculating device 16 then supplies the obtained correction amount signal Sa to the sharpness processing device 17.

Based on the correction amount signal Sa, the sharpness processing device 17 performs the sharpness processing on the original image data So and generates the correction image data Sc (step S4). Specifically, as shown in FIG. 3(a) and FIG. 4, the sharpness processing means 17 adds the correction amount signal Sa to the original image data So to generate the correction image data Sc. The sharpness processing device 17 then outputs the generated correction image data Sc to the driver 12.

The driver 12 displays the received correction image data Sc on the display unit 13 (step S5). In this manner, the sharpness process according to the present invention is performed, and the correction image data Sc, which has been corrected by the sharpness processing, is displayed on the display unit 13.

[Modifications]

The image data is color image data containing color components in the above description. An image display unit or the like to which the sharpness processing of the present invention is applied can process image data for each color of RGB and can display the image by individually applying the sharpness processing to the image data of each color of RGB.

In such a case, the correction-reference-amount determining device in the sharpness processing unit 11 first determines brightness data from the image data of each color of RGB and may use the brightness data to generate the correction reference amount, i.e., the Laplacian signal or the difference signal. In such a case, when the original image data of individual colors of the RGB before being corrected by the sharpness processing are R, G, and B, respectively, the image data Rc, Gc, and Bc of individual colors of RGB after the correction can be expressed as:

$Rc=R+F(Yr)$, $Gc=G+F(Yr)$, and $Bc=B+F(Yr)$, where Yr is a correction reference amount determined based on brightness data Y determined from the original image data.

When it is not desirable to determine brightness data from the image data of individual colors of RGB as described above due to a reason that the capability of hardware, such as an image display device to which the sharpness processing of the present invention is applied is limited or high-speed processing is required, only G (green) data can be used instead of the brightness data. Thus, in accordance with the G data, the correction-reference-amount determining device 15 can generate the Laplacian signal or difference signal to provide a correction reference amount. This is because G (green) is generally said to be the highest in sensitivity and is low in noise when image data is provided as image data of individual colors of RGB. Therefore, when G data is used to determine the correction reference amount, it is relatively easy to distinguish between an original outline and noise. Thus, there is an advantage in that it is easy to sharpen even color data, such as B and G, that are difficult to distinguish between an outline and noise. In addition, since there is no need to determine brightness data from the image data of each color of RGB as described above, naturally, the processing burden is reduced. Thus, there is an advantage in that the processing can be sped up.

When the correction reference amount is determined using G data in such a manner, image data Rc, Gc, and Bc of individual colors of RGB after the correction can be expressed as follows:

$Rc=R+F(Gr)$, $Gc=G+F(Gr)$, and $Bc=B+F(Gr)$, where Gr is a correction reference amount generated based on the G data.

APPLICATION EXAMPLES

Next, a description is provided of application examples of the sharpness processing according to the present invention. A first application example is described below with reference to FIG. 11A.

Figure 11A:
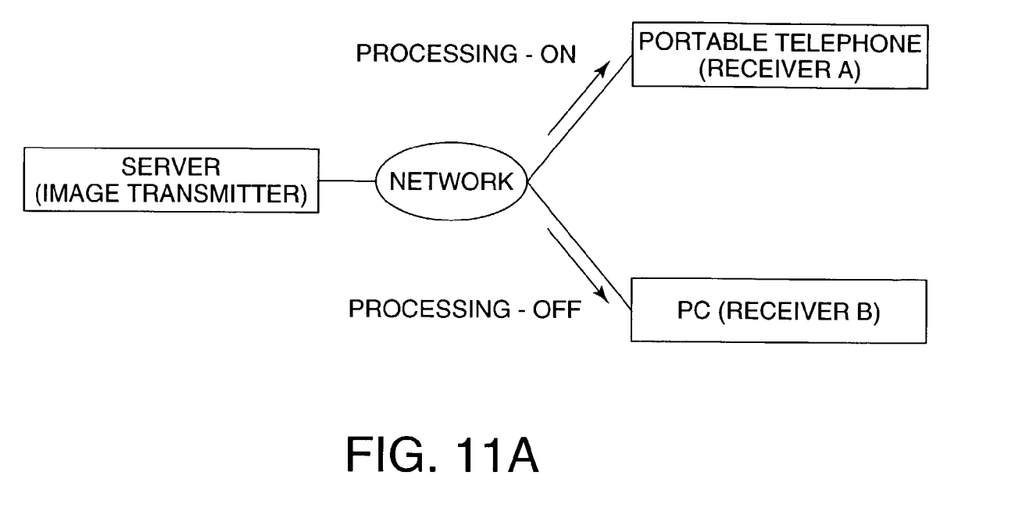
FIGS. 11A and 11B are schematics that show an application example of the sharpness processing of the present invention.

FIG. 11A shows an example in which the sharpness processing of the present invention is applied to the transmission of image data over a network. A server, which is a transmitter of an image, transmits image data to a receiver A and a receiver B over a network. The receiver A uses a portable telephone as the image display unit and the receiver B uses a personal computer (PC) as the image display unit. In this case, the server realizes what is each of the image display units (whether the portable telephone or the PC) used by the receivers A and B based on data contained in communication signals. Thus, during the communication with the receiver A, the server receives device specific information indicating that the device used by the receiver A is a portable telephone. Also, during the communication with the receiver B, the server receives, from the PC, device specific information indicating that the device used by the receiver B is a PC.

Upon receiving from the receiver A a request to transmit particular image data, the server transmits image data for which the request has been made. In this case, since the display region of a portable telephone is generally small, the image data to be transmitted is subjected to the sharpness processing according to the present invention and then is transmitted. The portable telephone of the receiver A directly displays the image data, received from the server, on the display portion of the portable telephone. Thus, an image that is effectively sharpened by the sharpness processing is displayed even on the display portion of a portable telephone having a relatively small display region.

Upon receiving from the receiver B a request for transmitting particular image data, the server transmits image data for which the request has been made. In this case, since the display region of a PC is generally relatively large, the image data is transmitted without performing the sharpness processing according to the present invention on the image data to be transmitted. The PC of the receiver B directly displays the image data, received from the server, on the display portion of the PC, an image that is adequately subjected to the sharpness processing is displayed on the display portion of the PC having a relatively large display region.

In addition, when information indicating the size of the image display region of a portable telephone, PC, or the like is included in the device specific information that the server can receive from the portable telephone and the PC, the server device can determine whether or not to perform the sharpness processing of the present invention on the image data to be transmitted in accordance with the size of the image display region.

Figure 11B:
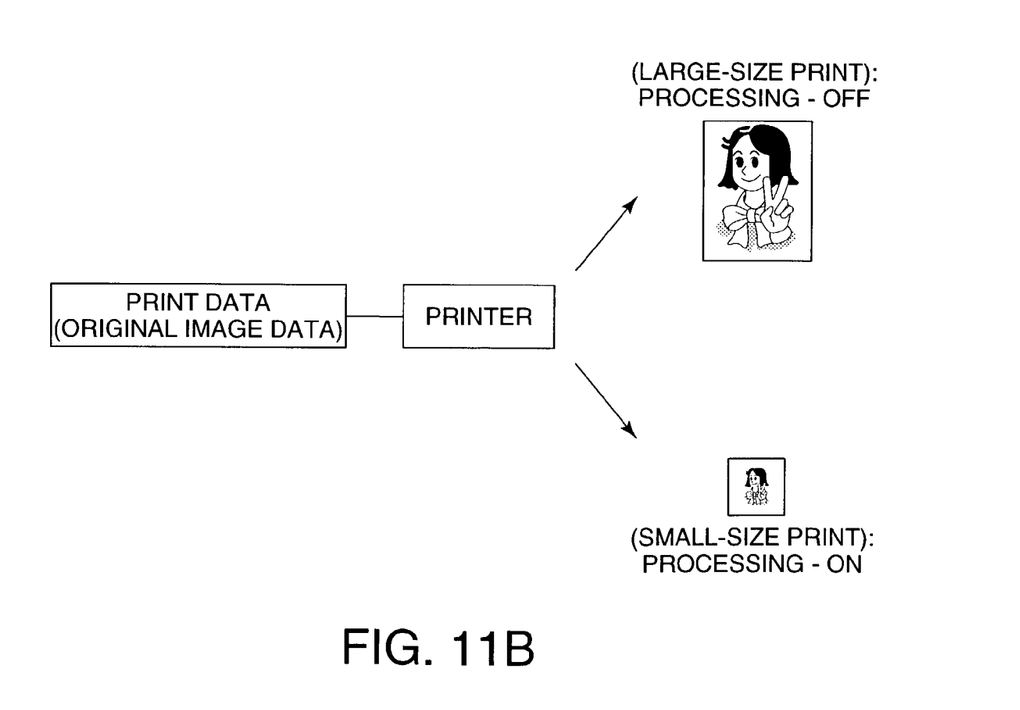

A second application example is described below with reference to FIG. 11B. This second application example is an example in which the sharpness processing of the present invention is applied to a case in which a color printer prints out an image. The printer receives a printing instruction and print data from an external PC or the like. The printing instruction includes print-size information indicating the size of image data to be printed. Thus, the printer refers to the print-size information, and prints print data without performing the sharpness processing of the present invention when printing print data larger than a predetermined print size. On the other hand, when the print-size information included in the printing instruction specifies a print size smaller than a predetermined print size, the printer prints the print data after applying the sharpness processing of the present invention thereto. With this arrangement, when the size of print data is small, image data that has been sharpened by the sharpness processing of the present invention is printed. This allows clear printing of an image even when the print size is small.

What is claimed is:

1. An image processing device, comprising:
   a correction-reference-amount determining device to detect a degree of a level change in original image data and to generate correction-reference-amount data indicating an reference amount for correction by sharpness processing in accordance with the degree of the detected level change;
   a correction-amount calculating device to calculate a correction amount in accordance with a pre-determined correction-amount determining pattern, based on the correction-reference-amount data; and
   a sharpness processing device to perform sharpness processing on the original image data in accordance with the correction amount to generate correction image data,
   the correction-amount determining pattern having a characteristic that the correction amount varies in accordance with the magnitude of the correction reference amount,
   when the original image data is So, the correction-reference-amount data is Sr, and the correction image data is Sc, the correction amount is a function, which is expressed by F (Sr), of the correction-reference-amount data and the correction image data Sc is expressed by Sc=So+F (Sr).

2. The image processing device according to claim 1, the correction determining pattern having a characteristic that the rate of change in the correction amount when the correction reference amount is a positive value and the rate of change in the correction amount when the correction reference amount is a negative value are different from each other.

3. The image processing device according to claim 1, the correction-amount determining pattern having a characteristic that the rate of change in the correction amount when the correction reference amount varies so that a white component in the original image data increases is smaller than the rate of change in the correction amount when the correction reference amount varies so that a black component in the original image data increases.

4. The image processing device according to claim 1, the correction-amount determining pattern having a characteristic that the rate of change in the correction amount when the absolute value of the correction reference amount is a first predetermined value or larger is smaller than the rate of change in the correction amount when the absolute value of the correction reference amount is less than the first predetermined value.

5. The image processing device according to claim 1, the correction-amount determining pattern being such that, when the correction reference amount is in the range from a second predetermined value at which the polarity of the correction reference amount is negative to a third predetermined value at which the polarity of the correction reference amount is positive, the correction amount is zero.

6. The image processing device according to claim 5, further comprising a device to perform smoothing processing on the original image data when the correction reference amount is in the range from the second predetermined value at which the polarity of the correction reference amount is negative to the third predetermined value at which the polarity of the correction reference amount is positive.

7. The image processing device according to claim 1, the correction-amount determining pattern having a characteristic that the relationship between the correction amount F (P) for a given first correction reference amount (P) and the correction amount F (−P) for a second correction reference amount (−P) having the absolute value equal to that of the first correction reference amount P and having a polarity different therefrom is given by:

$$|F(P)|<|F(-P)|$$

when the correction reference amount P is sufficiently large.

8. The image processing device according to claim 1, the correction-reference-amount data being a Laplacian of the original image data.

9. The image processing device according to claim 1, the correction-reference-amount data being a difference signal data obtained by subtracting unsharp data from the original image data, the unsharp data being obtained by filtering the original image data with a predetermined unsharp filter.

10. An image outputting device, comprising:
the image processing device according to claim 1;
an image-size determining device to determine an image size when the image data is output;
a control device to cause the image processing device to execute sharpness processing on the original image data when the image size determined by the image-size determining device is smaller than a predetermined image size; and
an output device to output the original image data or correction image data obtained by the sharpness processing.

* * * * *